US011150889B1

(12) United States Patent
Meruva et al.

(10) Patent No.: US 11,150,889 B1
(45) Date of Patent: Oct. 19, 2021

(54) USAGE PROFILE BASED REMOTE FIRMWARE UPGRADE FOR FIRE ALARM SYSTEM GATEWAY

(71) Applicant: Honeywell International Inc., Morris Plains, NJ (US)

(72) Inventors: Jayaprakash Meruva, Bangalore (IN); Vipindas E K, Kannur (IN); Rajesh Babu Nalukurthy, Bangalore (IN); Akash Pacharne, Bangalore (IN)

(73) Assignee: Honeywell International Inc., Charlotte, NC (US)

( * ) Notice: Subject to any disclaimer, the term of this patent is extended or adjusted under 35 U.S.C. 154(b) by 0 days.

(21) Appl. No.: 16/887,989

(22) Filed: May 29, 2020

(51) Int. Cl.
| | |
|---|---|
| *G06F 9/44* | (2018.01) |
| *G06F 8/65* | (2018.01) |
| *H04L 29/08* | (2006.01) |
| *H04L 12/66* | (2006.01) |
| *H04L 29/06* | (2006.01) |
| *H04L 12/28* | (2006.01) |
| *H04W 4/70* | (2018.01) |
| *H04W 8/18* | (2009.01) |
| *H05B 47/115* | (2020.01) |

(52) U.S. Cl.
CPC ............ *G06F 8/65* (2013.01); *H04L 12/2814* (2013.01); *H04L 12/66* (2013.01); *H04L 65/102* (2013.01); *H04L 67/025* (2013.01); *H04L 67/34* (2013.01); *H04W 4/70* (2018.02); *H04W 8/18* (2013.01); *H05B 47/115* (2020.01)

(58) Field of Classification Search
CPC ... H04L 65/102; H04L 12/2814; H04L 12/66; H04L 67/34; H04L 67/025; H04W 4/70; H04W 8/18; G06F 8/65; H05B 47/115
See application file for complete search history.

(56) References Cited

U.S. PATENT DOCUMENTS 6,388,399 B1 * 5/2002 Eckel ............... H05B 47/115
315/312
8,581,720 B2 11/2013 Fisher et al.
(Continued)

OTHER PUBLICATIONS

Esser-Honeywell, "Fire Alarm Systems", Product Catalog 2015, pp. 1-330 <Esser_catalog2015.pdf>.*

*Primary Examiner* — Tuan A Vu
(74) *Attorney, Agent, or Firm* — Brooks, Cameron & Huebsch, PLLC (57) ABSTRACT

Methods and devices for usage profile based remote firmware upgrades for fire alarm system gateways are described herein. A method, includes creating a firmware upgrade package for a number of gateways of a number of fire alarm systems wherein each gateway has gateway operating firmware, panel connectivity firmware, and management firmware and wherein the firmware upgrade package has multiple parts, creating a firmware upgrade profile having information indicating the applicability of each of the multiple parts of the firmware upgrade package to one of the gateway operating firmware, panel connectivity firmware, and management firmware, comparing the firmware upgrade profile to a gateway profile of a particular gateway wherein the gateway profile contains information indicating usage characteristics for the gateway operating firmware, panel connectivity firmware, and management firmware, and selecting one or more of the multiple parts of the firmware upgrade package to download.

20 Claims, 5 Drawing Sheets

(56) References Cited

U.S. PATENT DOCUMENTS

| | | | |
|---|---|---|---|
| 9,471,300 B2 | 10/2016 | Mangaiahgari | |
| 9,513,898 B2 | 12/2016 | Solnit et al. | |
| 2004/0203755 A1* | 10/2004 | Brunet | H04W 8/18 |
| | | | 455/432.1 |
| 2010/0023865 A1* | 1/2010 | Fulker | H04L 67/025 |
| | | | 715/734 |
| 2010/0202450 A1* | 8/2010 | Ansari | H04L 12/2814 |
| | | | 370/389 |
| 2012/0060151 A1 | 3/2012 | Oh et al. | |
| 2014/0096126 A1 | 4/2014 | Gourlay et al. | |
| 2018/0234266 A1* | 8/2018 | Rudolph | H04L 65/102 |
| 2020/0076896 A1* | 3/2020 | Anumala | H04W 4/70 |

\* cited by examiner

Fig. 5

USAGE PROFILE BASED REMOTE FIRMWARE UPGRADE FOR FIRE ALARM SYSTEM GATEWAY

TECHNICAL FIELD

The present disclosure relates to fire alarm systems, and in particular, gateways for use in fire alarm systems.

BACKGROUND

Fire alarm system gateways are devices that can be expected to support various southbound drivers, to communicate to different fire panel brands (e.g., Gent, Notifier, Notifier-Inspire, Esser, Firelite, Printer port, Gamewell FCI, Morley, Eltek, Fusion), and various northbound drivers, to connect to a proprietary cloud and/or other management systems, for example, through Honeywell Forge/CLSS, Modbus, BACnet, AlarmNet transport (AlarmT), Matrix, etc.

Currently, the gateway firmware is configured in the factory as a single monolithic package with all the drivers and shipped to customer sites. If there are any changes to any parts of the firmware, the entire firmware is packaged with all the drivers again and distributed as single upgrade package. This leads to several issues.

For example, any change to any part of the northbound or southbound drivers (e.g., an event that can occur with a small bug-fix) leads to distributing a new package which needs to be applied to all the gateways. Several customers may not install this new package, even though the upgrade package includes a description of the details of the upgrade and the applicability indicates that all the gateways in the field need the update and a notification goes to all the customers.

Though the impact driver or module size may be small, the upgrade overall package size can be large and will consume more bandwidth to download. This becomes costly when this upgrade happens over a cellular network.

Another concern is where a specific change/feature addition on a specific use case forces the software engineers to validate the entire package even though the change/feature addition may be small. For example, typically a check point change/feature addition need not be tested in a use case with alarm routing, however, since the package is a unitary, single package with all drivers, all the modules in the package have to be validated thoroughly before the release, which takes more time to release to market and causes a lot of work for the software engineers.

The current approach also impacts regulatory approvals for specific use cases as the unitary, single package may need to be reevaluated in each use case rather than the specific software having to do with a particular use case. Further, some jurisdiction may require recertification of the firmware due to the upgrade and others may not. Since the update is distributed to all gateways, this procedure effectively requires all updates to be recertified as even those intended to only affect gateways in jurisdictions not requiring recertification will be install in jurisdictions requiring recertification.

DETAILED DESCRIPTION

As discussed above, methods and devices for usage profile based remote firmware upgrades for fire alarm system gateways are described herein. Embodiments of the present disclosure allow for the system to update firmware based on usage characteristics of components of the fire alarm system, as described in more detail below.

For example, in one embodiment, a method, includes creating a firmware upgrade package for a number of gateways of a number of fire alarm systems wherein each gateway has gateway operating firmware, panel connectivity firmware, and management firmware and wherein the firmware upgrade package has multiple parts (e.g., including upgrades to at least one of the gateway operating firmware, panel connectivity firmware, and management firmware). This example method also includes creating a firmware upgrade profile having information indicating the applicability of each of the multiple parts of the firmware upgrade package to one of the gateway operating firmware, panel connectivity firmware, and management firmware, comparing the firmware upgrade profile to a gateway profile of a particular gateway wherein the gateway profile contains information indicating usage characteristics for the gateway operating firmware, panel connectivity firmware, and management firmware, and selecting one or more of the multiple parts of the firmware upgrade package to download to the particular gateway based on the comparison of the firmware upgrade profile and the gateway profile.

In the embodiments of the present disclosure, an approach is presented where a remote upgrade of the gateway firmware is based on the usage pattern/behavior of the system. For example, in such a system, the gateway can be analyzed, for instance, over a period of time, based on its configuration, for one or more specific use cases and/or runtime behavior of the system. As used herein, a use case can be an indication of actual use of a component (such as a protocol driver) of the system based on analysis of data from the system or can be based on a standard configuration used for a particular system setup (e.g., when a Notifier protocol driver is used, then a cloud connection type is used).

For instance, a gateway may be configured to connect a Notifier brand fire panel to a connected life safety services (CLSS) cloud connectivity having AlarmNet alarm transport. The usage pattern of the gateway can be identified as Notifier for a southbound (i.e., to the fire control panel) driver, and CLSS Cloud and Alarm Net for the northbound (i.e., to the fire management system, such as at a remote command center) driver. Similarly, the panel connectivity of the gateway can be identified as being configured for Gent brand southbound panel connectivity and only CLSS cloud as northbound management connectivity. In such an embodiment, the runtime behavior can be identified as Gent+CLSS Cloud and this information can be provided in the gateway profile for this particular gateway.

The entire firmware upgrade can be divided into multiple distributable packages. For example, kernel, BSP (boot strap processor programming), and common middleware modules as one part, with each of the northbound drivers, and southbound drivers as different additional parts. In this manner, the system can analyze the configuration information regarding the system and only download and upgrade the parts relevant to the particular system components or configuration being used during the time period that has been analyzed.

From the factory, the gateway will be loaded with the entire bundle including Kernel, BSP, common middleware modules, northbound drivers, and southbound drivers. Once it is deployed at the customer site, the distribution of further upgrades is done based on analysis of use case scenario information for which the gateway is functioning in the field.

To do so, every distributable package will have a unique profile which includes: what part of the firmware modules the package is carrying, their versions, and their potential applicability for a target gateway. This information is compared with the as configured gateway use case information, for the specific target gateway, to determine the applicability of the different firmware upgrade parts.

Whenever a new upgrade package is uploaded to a system management device (e.g., cloud computing device having access to the fire alarm system), every gateway in the field will download the release profile corresponding to the package notification or the release profile will be pushed to the gateway devices. Based on the release profile, if a specific part of the firmware upgrade is determined to be, for example, valid and required, based on comparison with the gateway profile information, the gateway will request the system management device to provide link/URI to download the specific required parts of the upgrade package.

If the gateway is, for example, scheduled for an auto upgrade or in case of manual upgrading, upon confirmation from a user, the gateway will download the required package parts, and can decrypt, and replace those specific applicable firmware parts (e.g., modules) with the new ones. Comparison of the gateway and upgrade profiles can happen either on the gateway or on a system device other than the gateway (e.g., in the cloud).

In embodiments where comparison takes place on another system device (e.g., within the fire alarm system or connected thereto, such as cloud based devices), all usage profiles of all gateways connected to the fire alarm system of the target gateway device or on multiple fire alarm systems can be managed on that device. In some such embodiments, the gateway can override the decision taken by the other system device.

The type of firmware distribution and upgrade systems of the present disclosure reduce overall testing effort as the firmware upgrades are needed only if there is a change on those specific use cases or runtime behaviors and firmware upgrading is only necessary for the impacted customers having gateways needing upgrading based on the impacted use cases or runtime behaviors.

Distribution of firmware for regulatory and non-regulatory protocols can be easily controlled with the embodiments of the present disclosure. This can be helpful where a jurisdiction, such as the United States regulates the upgrading of such firmware and requires certification of the upgrades before performing the upgrades. In jurisdictions where the is no certification, such as the European Union in this example, it may be desirable to make updates to the firmware more often as certification is not needed. The embodiments of the present disclosure allow less than all upgrades or less than all parts of an upgrade package to be installed on some gateways that have jurisdictional restrictions.

Such criteria can be part of the gateway profile information and used to determine whether certain parts of the update package can be installed. this and other benefits of the present disclosure are discussed in more detail below with respect to the accompanying drawings.

In the following detailed description, reference is made to the accompanying drawings that form a part hereof. The drawings show, by way of illustration, how one or more embodiments of the present disclosure may be practiced.

These embodiments are described in sufficient detail to enable those of ordinary skill in the art to practice one or more embodiments of the present disclosure. It is to be understood that other embodiments may be utilized and that process, computerized, and/or structural changes may be made without departing from the scope of the present disclosure.

As will be appreciated, elements shown in the various embodiments herein can be added, exchanged, combined, and/or eliminated so as to provide a number of additional embodiments of the present disclosure. The proportion and the relative scale of the elements provided in the figures are intended to illustrate the embodiments of the present disclosure and should not be taken in a limiting sense.

The figures herein follow a numbering convention in which the first digit or digits correspond to the drawing figure number and the remaining digits identify an element or component in the drawing. Similar elements or components between different figures may be identified by the use of similar digits. For example, 120 may reference element "20" in FIG. 1, and a similar element may be referenced as 220 in FIG. 2. Further, the use of letters in identifiers (e.g., 118-M) indicate that any number of these multiple items with that number may be used in the embodiments.

As used herein, "a" or "a number of" something can refer to one or more such things. For example, "a number of gateways" can refer to one or more gateways. As used herein, "a plurality of" means two or more things.

Figure 1:
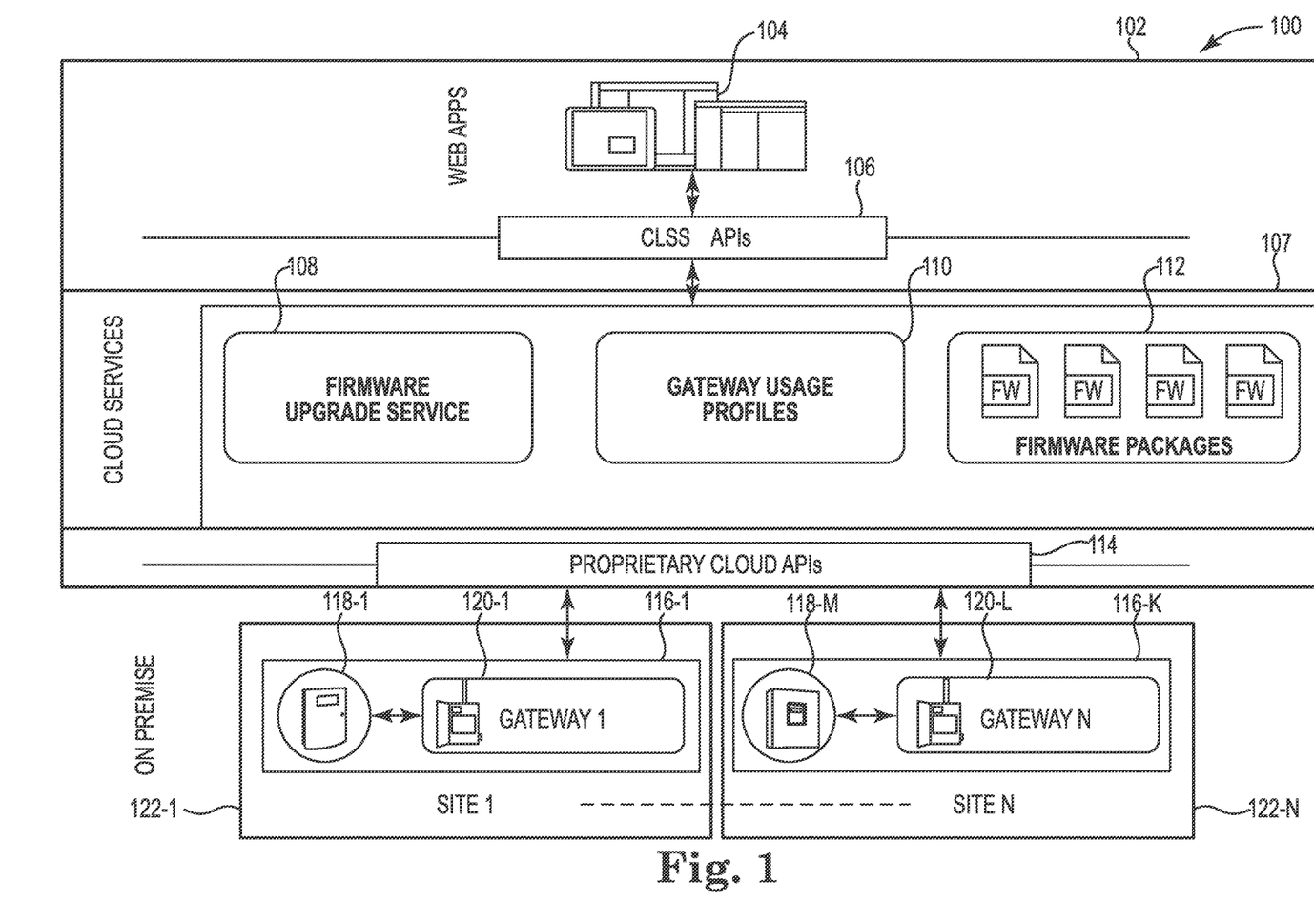
FIG. 1 illustrates an example fire alarm system that can utilize embodiments of the present disclosure.

FIG. 1 illustrates an example fire alarm system that can utilize embodiments of the present disclosure. The embodiment of the present disclosure shown in FIG. 1 includes an overall system 100 having a system management device 102.

This device 102 can, for example, provide a cloud environment that can allow access to the fire alarm systems 116-1, 116-K, for example via one or more web applications 104 that allow access, for instance, by system management personnel that may be remote from the site of a fire alarm system. Through such access, the personnel can access the firmware updating functionalities (firmware upgrade service 108), data (gateway usage profiles 110), and upgrade packages (firmware packages 112) shown in FIG. 1 as cloud services 107 (e.g., via CLSS APIs 106) although not limited to being on the cloud.

These fire alarm systems can be at a single physical location (site) or at multiple locations as indicated at 122-1, 122-N. As shown, the one or more fire alarm systems can each include one or more fire system control panels 118-1, 118-M and/or one or more gateway devices 120-1, 120-L.

The system management device 102 can communicate with the one or more fire alarm systems 116-1, 116-K via a number of application programming interface statements (APIs) 114. Such communications can facilitate the transmission of the firmware upgrades themselves (112), for example, via the firmware upgrade service 108 as well as gateway usage information including gateway profiles (e.g., gateway usage profiles 110).

Provided below is one example of a device for use in an embodiment of the present disclosure. In this example, a firmware upgrade management device (e.g., system management device 102) has computing device executable instructions (provided by software executed by a processor and/or firmware) thereon to perform a method, including: creating a firmware upgrade package for a number of gateways of a number of fire alarm systems wherein each gateway has gateway operating firmware, panel connectivity firmware, and management firmware and wherein the firmware upgrade package has multiple parts, creating a firmware upgrade profile having information indicating the applicability of each of the multiple parts of the firmware upgrade package to one of the gateway operating firmware, panel connectivity firmware, and management firmware, and comparing the firmware upgrade profile to a gateway profile of a particular gateway wherein the gateway profile contains information indicating usage characteristics for the gateway operating firmware, panel connectivity firmware, and management firmware.

The comparison is used to select one or more of the multiple parts of the firmware upgrade package to download to the particular gateway based on the comparison of the firmware upgrade profile and the gateway profile. The functionalities of such a device can be further understood in view of the discussion provided below.

Figure 2:
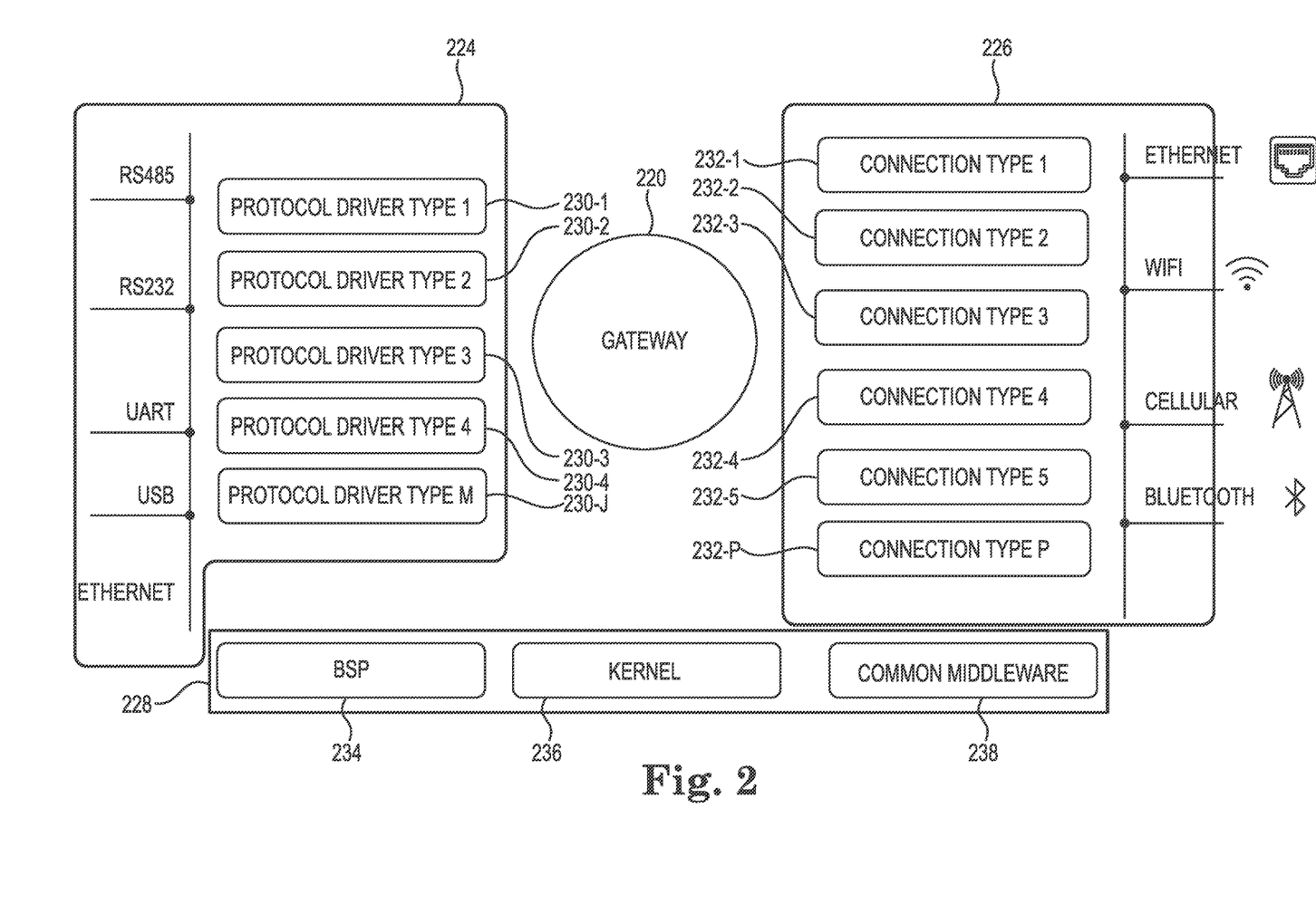
FIG. 2 illustrates gateway connectivity within a fire alarm system according to an embodiment of the present disclosure.

FIG. 2 illustrates gateway connectivity within a fire alarm system according to an embodiment of the present disclosure. In the embodiment shown in FIG. 2, the gateway 220 includes gateway operating firmware 228 (which includes, for example, BSP firmware 234, Kernel firmware 236, and common middleware (e.g., bridging instructions executable by the processor of the gateway for allowing the northbound and southbound connectivities to communicate with each other)).

The gateway also includes northbound connectivity 224 and southbound connectivity 226. As used herein, northbound and southbound connectivities are used only to illustrate that the connectivities 224 and 226 are different types of connectivity characteristics and are not meant to connote a direction.

The southbound connectivity elements 224 include characteristics of the communication type used by various fire alarm systems to communicate with one or more fire alarm system control panel types (e.g., 118-1, 118-M of FIG. 1). For example, the characteristics can include, fire control panel brand, fire control panel model, firmware version, and protocol driver. For instance, a particular protocol driver type can be one of: RS485, RS232, universal asynchronous receiver-transmitter (UART), or universal serial bus (USB), ethernet, among other suitable types. Examples of the panel connectivity firmware include fire control panel brand firmware types such as: Gent, Notifier, Esser, Firelite, Printer port, Gamewell FCI, Morley, Notifire Inspire, Eltek, and Fusion firmware types, among others. In FIG. 2 several protocol driver types are provided in the gateway at 230-1, 230-2, 230-3, 230-4, 230-J.

The northbound connectivity elements 226 include characteristics of the communication types used by various fire alarm systems to communicate with one or more system management devices (e.g., 102 of FIG. 1). For example, the characteristics can include, firmware type, version, and connection type.

For example, some firmware types include: Connected Life Safety Services/Forge (CLSS) Cloud, Rapid Response, AlarmNet, BACnet, Modbus, and Matrix firmware types, among others. Some examples of connection types include: ethernet, Wi-Fi, cellular, and Bluetooth, among others. In FIG. 2 several connection types are provided in the gateway at 232-1, 232-2, 232-3, 232-4, 232-5, 232-P.

Figure 3:
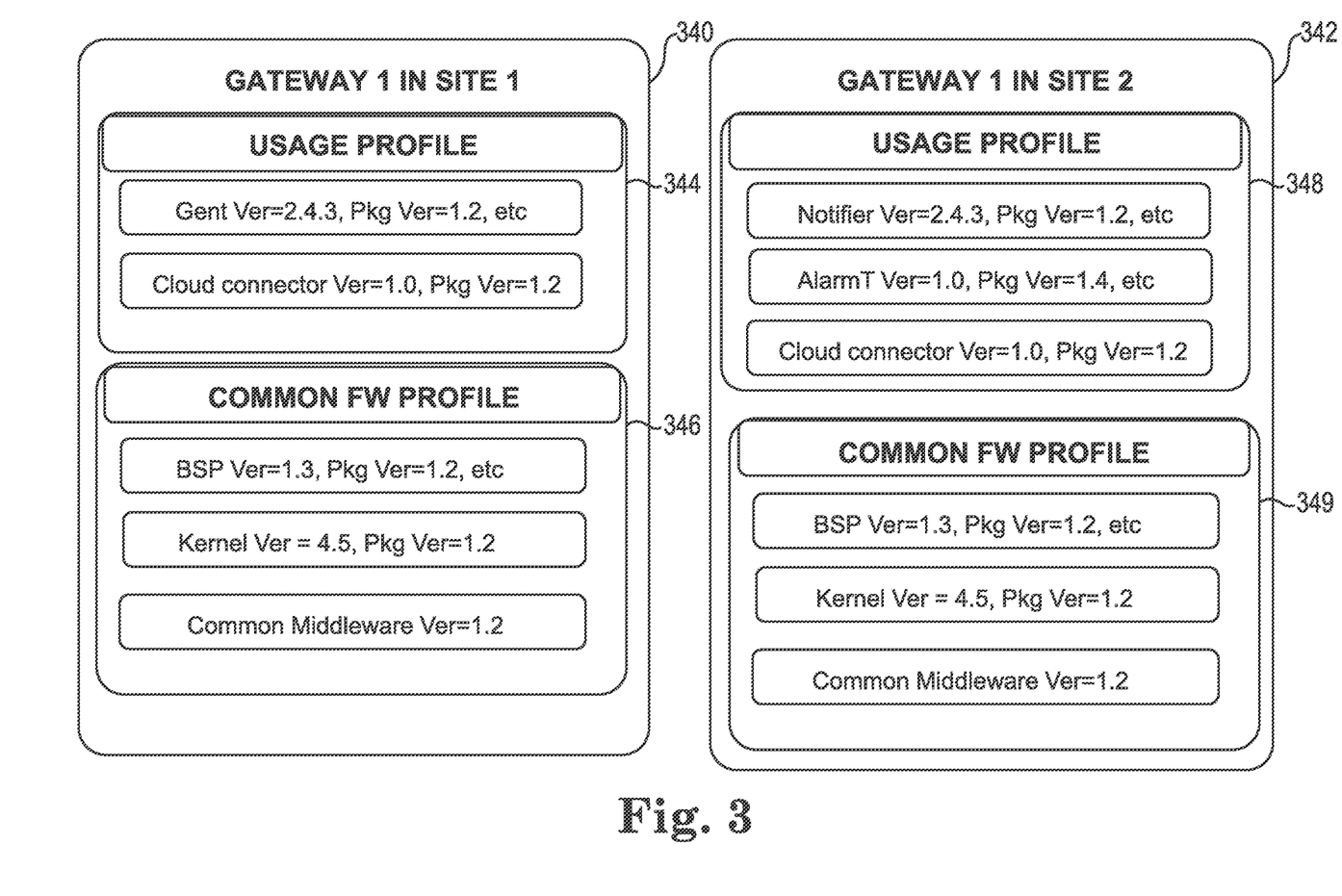
FIG. 3 illustrates sample gateway profiles according to an embodiment of the present disclosure.

FIG. 3 illustrates sample gateway profiles according to an embodiment of the present disclosure. In the embodiment illustrated in FIG. 3, a profile for a first gateway 340 is shown on the left with a profile of another gateway 342 shown on the right.

As can be understood from viewing the two gateway profiles, their configurations are quite different. Both gateways have the same common firmware profile elements 346/349 (i.e., BSP version 1.3, package version 1.2; Kernel version 4.5, package version 1.2; and common middleware version 1.2). However, the left gateway uses Gent firmware, while the right gateway uses Notifier firmware and AlarmT, with both gateways using the cloud connector to handle connections with a system management device. In some embodiments, the management firmware is a connection handler that determines which connections to use to connect to other devices within or outside the fire alarm system.

Accordingly, their associated usage profiles (344 and 348, respectively) indicate that these items are being used (they would not be listed if they were not being used) and the version. In some embodiments, the model of device being connected to can also be included in the profile information.

The presence of these items being used on the profile can be used as an indicator that the items have been used by the gateway or an indicator can be included in the profile. Any suitable indicator can be used. The indicator or the inclusion of the item being used can be added to the profile, for example, when the gateway is configured or at a later time either automatically or by management personnel.

Further, the profile information can be compiled into the profile periodically or usage can be tracked by executable instructions in the gateway during a period of time and the item can be included in the usage profile (of the gateway profile) if it has been used within the period of time being tracked. This inclusion can be done by management personnel or automatically through use of executable instructions. For example, the usage can be tracked in the form of a runtime behavior, where the behavior of the gateway can be monitored and any items used during a period of time can be added to the gateway profile.

Figure 4:
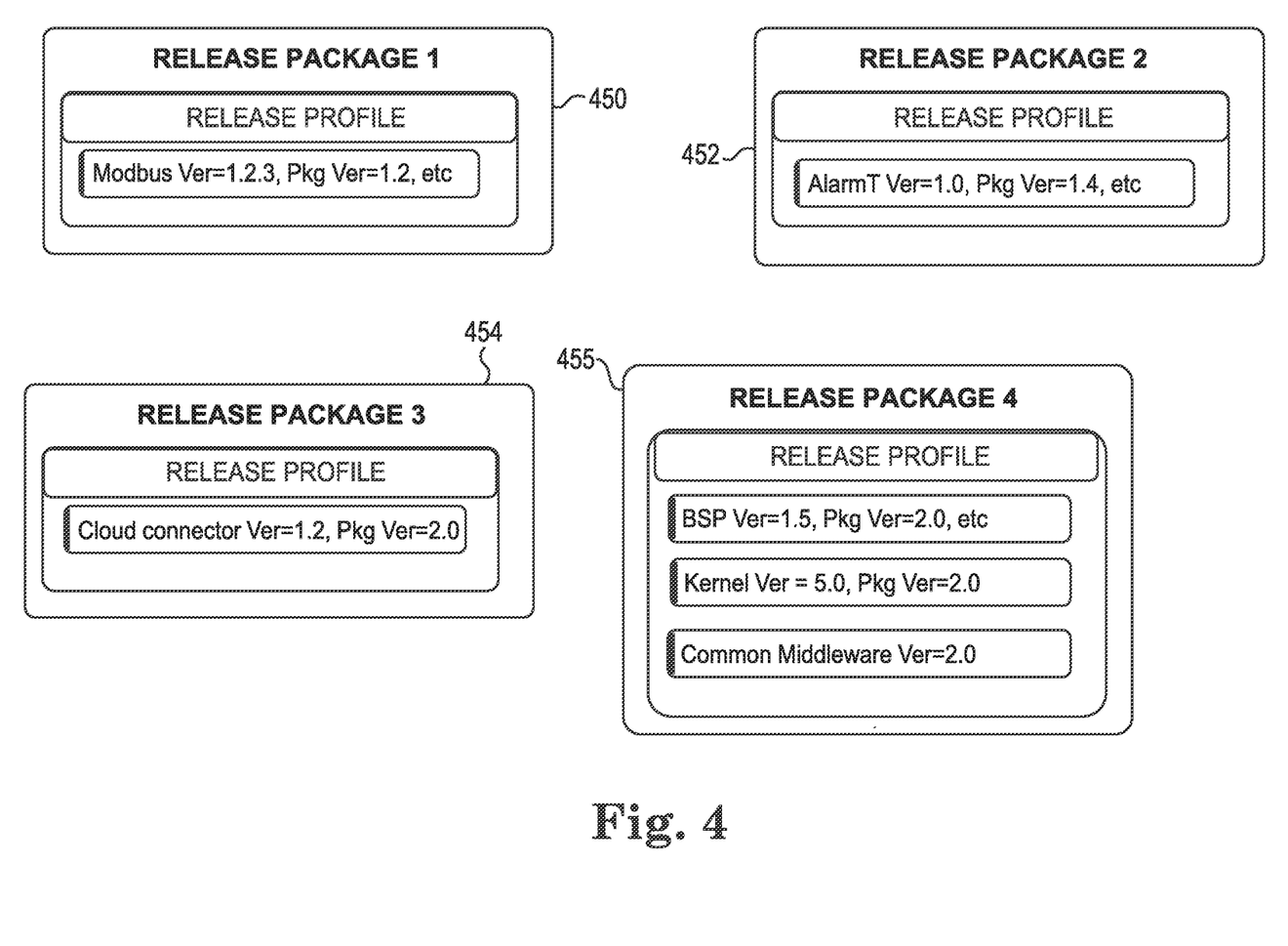
FIG. 4 illustrates sample release package profiles according to an embodiment of the present disclosure.

FIG. 4 illustrates sample release package profiles according to an embodiment of the present disclosure. In the embodiment illustrated in FIG. 4, several release profiles (firmware upgrade profiles) are shown. Each release profile includes details of the items to be released in their respective release package.

In FIG. 4, an upgrade package has multiple parts labeled release packages 1-4. For example, in release package 1, at 450, the release profile indicates that a Modbus upgrade is being provided to the gateways. The information in the release profile also includes Modbus version (1.2.3) and package version (1.2). This release profile information can be used to determine whether the upgrade should be provided to a particular gateway. For example, in looking at the gateway profiles of gateways 1 and 2 of FIG. 3, the comparison indicates that neither gateway is using Modbus and, therefore, the upgrade of release package 1 is not necessary and should not be sent to or retrieved by gateways 1 or 2.

Release package 2, at 452, includes an AlarmT upgrade. In comparison of this release profile with the profiles of gateways 1 and 2 of FIG. 3, gateway 2 uses AlarmT and, therefore, the upgrade should be implemented on gateway 2. In this manner, when a match is found between the information in the release profile and a gateway profile, it indicates that the upgrade is necessary and that the gateway should obtain the upgrade package containing the upgrade that was matched (e.g., AlarmT in the above example).

As discussed herein, comparison can also be made to the version or model information to make sure the upgrade is necessary. In this case, the version information for the AlarmT component matches, but in some embodiments, the versions could be different indicating that a different version is available to the gateway.

With regard to release package 3, at 454, the comparison with the profile of gateways 1 and 2, the upgrade is relevant to both gateways. Accordingly, each gateway can receive the upgrade package and make the upgrade. Further, release package 4, at 455, includes gateway operation firmware and, therefore, in comparison with the gateway profiles for gateways 1 and 2, the upgrade is necessary. With gateway operation firmware, it may be the case that all gateways would need this upgrade and, therefore, every comparison of profiles would indicate that the upgrade is necessary. It should be noted that if more than one release profile indicates that the upgrade is necessary, the release packages can be sent as separate packages, bundled in multiple groups of upgrades, or can be aggregated into a single, unitary upgrade package.

Figure 5:
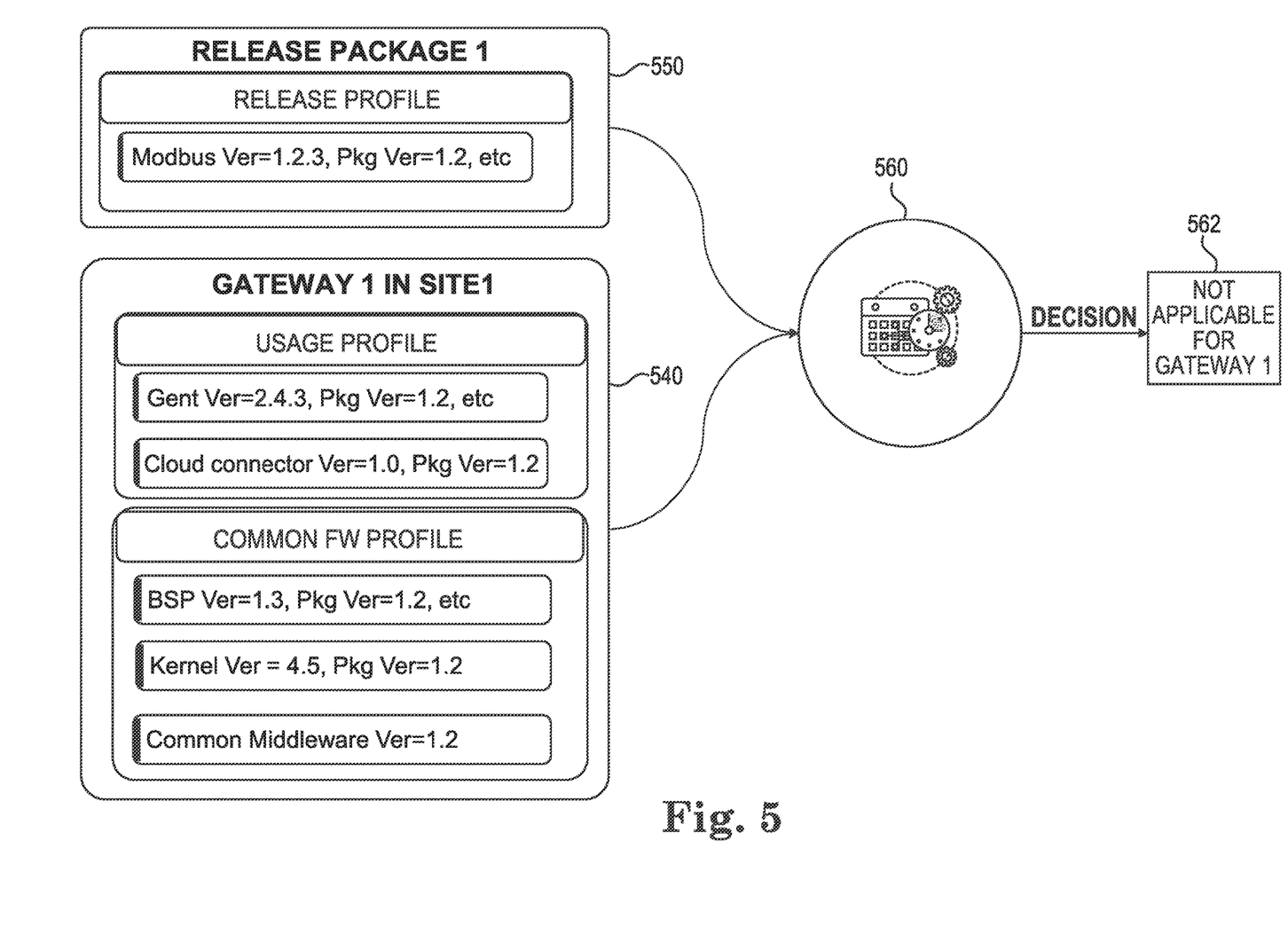
FIG. 5 illustrates a comparison of a gateway profile and a release package profile according to an embodiment of the present disclosure.

FIG. 5 illustrates a comparison of a gateway profile and a release package profile according to an embodiment of the present disclosure. FIG. 5 provides an illustration of how the comparison is accomplished regarding a release profile of release package 550 and a set of gateway profiles including a common firmware profile and a usage profile on a gateway device 540.

In this illustration, a decision engine 560 (located on a gateway or system management device) can be used to evaluate whether the upgrade should be implemented on a particular gateway. Based on the comparison of the release profile and the usage profile and common firmware profile of the gateway profile, the upgrade is not applicable. Accordingly, the upgrade to the Modbus should not be implemented on gateway 1 (indicated at 540).

As can be understood from the above discussion, the embodiments of the present disclosure provide significant benefits with regard to remote firmware upgrading for gateways of fire alarm systems. These benefits include shorter upgrading periods, less time and bandwidth used for data transfer to accomplish the upgrades, and less oversight needed for reviewing an entire firmware package upgrade as the entire firmware package does not need to be resent to each gateway, among other benefits.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion and not a restrictive one. Combination of the above embodiments, and other embodiments not specifically described herein, will be apparent to those of skill in the art upon reviewing the above description.

The scope of the various embodiments of the disclosure includes any other applications in which the above structures and methods are used. Therefore, the scope of various embodiments of the disclosure should be determined with reference to the appended claims, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. A firmware upgrade method for fire alarm system gateways, comprising:
   creating a firmware upgrade package for a number of gateways of a number of fire alarm systems wherein each gateway has gateway operating firmware, panel connectivity firmware, and management firmware and wherein the firmware upgrade package has multiple parts;
   creating a firmware upgrade profile having information indicating the applicability of each of the multiple parts of the firmware upgrade package to one of the gateway operating firmware, panel connectivity firmware, and management firmware;
   comparing the firmware upgrade profile to a gateway profile of a particular gateway wherein the gateway profile contains information indicating usage characteristics for the gateway operating firmware, panel connectivity firmware, and management firmware; and
   selecting one or more of the multiple parts of the firmware upgrade package to download to the particular gateway based on the comparison of the firmware upgrade profile and the gateway profile.

2. The firmware upgrade management method for upgrading fire alarm system gateways of claim 1, wherein the information indicating the applicability of each of the multiple parts includes applicability to a particular fire panel brand.

3. The firmware upgrade management method for upgrading fire alarm system gateways of claim 1, wherein the information indicating the applicability of each of the multiple parts includes applicability to a particular fire panel model.

4. The firmware upgrade management method for upgrading fire alarm system gateways of claim 1, wherein the information indicating the applicability of each of the multiple parts includes applicability to a particular fire panel firmware version.

5. The firmware upgrade management method for upgrading fire alarm system gateways of claim 1, wherein the information indicating the applicability of each of the multiple parts includes applicability to a particular protocol driver type.

6. The firmware upgrade management method for upgrading fire alarm system gateways of claim 1, wherein the information indicating the applicability of each of the multiple parts includes applicability to a particular protocol driver type selected from the group including: RS485, RS232, universal asynchronous receiver-transmitter (UART), universal serial bus (USB), ethernet protocol drivers.

7. The firmware upgrade management method for upgrading fire alarm system gateways of claim 1, wherein the information indicating the applicability of each of the multiple parts includes applicability to a particular connection type.

8. The firmware upgrade management method for upgrading fire alarm system gateways of claim 1, wherein the information indicating the applicability of each of the multiple parts includes applicability to a particular connection type selected from the group including: ethernet, Wi-Fi, cellular, and Bluetooth connection types.

9. The firmware upgrade management method for upgrading fire alarm system gateways of claim 1, wherein the gateway includes bridging executable instructions for allowing communication between the panel connectivity firmware and the management firmware and wherein the firmware update package includes updated the bridging executable instructions and that the bridging executable instructions are included in the gateway operating firmware.

10. A firmware upgrade method for fire alarm system gateways, comprising:
  creating a firmware upgrade package for a number of gateways of a number of fire alarm systems wherein each gateway has gateway operating firmware, panel connectivity firmware, and management firmware and wherein the firmware upgrade package has multiple parts including upgrades to at least one of the gateway operating firmware, panel connectivity firmware, and management firmware;
  creating a firmware upgrade profile having information indicating the applicability of each of the multiple parts of the firmware upgrade package to one of the gateway operating firmware, panel connectivity firmware, and management firmware;
  comparing the firmware upgrade profile to a gateway profile of a particular gateway wherein the gateway profile contains information indicating usage characteristics for the gateway operating firmware, panel connectivity firmware, and management firmware; and
  selecting one or more of the multiple parts of the firmware upgrade package to download to the particular gateway based on the comparison of the firmware upgrade profile and the gateway profile.

11. The firmware upgrade management method for upgrading fire alarm system gateways of claim 10, wherein comparing the firmware upgrade profile to a gateway profile of a particular gateway wherein the gateway profile contains information indicating usage characteristics for the gateway operating firmware, panel connectivity firmware, and management firmware wherein the usage characteristic includes an indicator of firmware usage for at least one of the gateway operating firmware, panel connectivity firmware, or management firmware.

12. The firmware upgrade management method for upgrading fire alarm system gateways of claim 10, wherein comparing the firmware upgrade profile to a gateway profile of a particular gateway wherein the gateway profile contains information indicating usage characteristics for the gateway operating firmware, panel connectivity firmware, and management firmware wherein the usage characteristic includes an indicator of firmware usage during a defined period of time for at least one of the gateway operating firmware, panel connectivity firmware, or management firmware.

13. The firmware upgrade management method for upgrading fire alarm system gateways of claim 10, wherein comparing the firmware upgrade profile to a gateway profile of a particular gateway wherein the gateway profile contains information indicating usage characteristics for the gateway operating firmware, panel connectivity firmware, and management firmware wherein the usage characteristic includes an indicator of runtime behavior for at least one of the gateway operating firmware, panel connectivity firmware, or management firmware.

14. The firmware upgrade management method for upgrading fire alarm system gateways of claim 10, wherein comparing the firmware upgrade profile to a gateway profile of a particular gateway wherein the gateway profile contains information indicating usage characteristics for the gateway operating firmware, panel connectivity firmware, and management firmware wherein the usage characteristic includes an indicator of runtime behavior during a defined period of time for at least one of the gateway operating firmware, panel connectivity firmware, or management firmware.

15. A firmware upgrade management device for upgrading fire alarm system gateways, comprising:
  a firmware upgrade management device having computing device executable instructions thereon to perform a method, comprising:
  creating a firmware upgrade package for a number of gateways of a number of fire alarm systems wherein each gateway has gateway operating firmware, panel connectivity firmware, and management firmware and wherein the firmware upgrade package has multiple parts;
  creating a firmware upgrade profile having information indicating the applicability of each of the multiple parts of the firmware upgrade package to one of the gateway operating firmware, panel connectivity firmware, and management firmware;
  comparing the firmware upgrade profile to a gateway profile of a particular gateway wherein the gateway profile contains information indicating usage characteristics for the gateway operating firmware, panel connectivity firmware, and management firmware; and
  selecting one or more of the multiple parts of the firmware upgrade package to download to the particular gateway based on the comparison of the firmware upgrade profile and the gateway profile.

16. The firmware upgrade management device for upgrading fire alarm system gateways of claim 15, wherein the firmware upgrade package has multiple parts including upgrades to at least one of the gateway operating firmware, panel connectivity firmware, and management firmware.

17. The firmware upgrade management device for upgrading fire alarm system gateways of claim 15, wherein the gateway operating firmware includes at least one firmware type selected from the group including: boot strap processing firmware (BSP), Kernel firmware, and common middleware firmware.

18. The firmware upgrade management device for upgrading fire alarm system gateways of claim 15, wherein the panel connectivity firmware includes at least one fire control panel brand firmware type selected from the group including: Gent, Notifier, Esser, Firelite, Printer port, Gamewell FCI, Morley, Notifire Inspire, Eltek, and Fusion firmware types.

19. The firmware upgrade management device for upgrading fire alarm system gateways of claim 15, wherein the management firmware includes at least one firmware type selected from the group including: Connected Life Safety Services/Forge (CLSS) Cloud, Rapid Response, AlarmNet, BACnet, Modbus, and Matrix firmware types.

20. The firmware upgrade management device for upgrading fire alarm system gateways of claim 15, wherein the management firmware is a connection handler that determines which connections to use to connect to other devices within or outside the fire alarm system.

\* \* \* \* \*